United States Patent [19]

Landau et al.

[11] Patent Number: 5,037,787

[45] Date of Patent: Aug. 6, 1991

[54] NICKEL PILLARED INTERLAYERED CLAY

[75] Inventors: Steven D. Landau, Union Township; James A. Hinnenkamp, St. Bernard, both of Ohio

[73] Assignee: Quantum Chemical Corporation, New York, N.Y.

[21] Appl. No.: 379,515

[22] Filed: Jul. 13, 1989

[51] Int. Cl.$^5$ .......................... B01J 20/12; B01J 21/16
[52] U.S. Cl. ............................................. 502/84
[58] Field of Search ................................. 502/84, 259

[56] References Cited

U.S. PATENT DOCUMENTS

| | | | |
|---|---|---|---|
| 4,579,832 | 4/1986 | Shabtai et al. | 502/84 |
| 4,665,044 | 5/1987 | Pinnavaia et al. | 502/84 |
| 4,920,086 | 4/1990 | Raythatha et al. | 502/84 |
| 4,923,837 | 5/1990 | Fukuhara et al. | 502/84 |

FOREIGN PATENT DOCUMENTS 58565 10/1979 Israel .

*Primary Examiner*—Carl F. Dees
*Attorney, Agent, or Firm*—Kenneth D. Tremain; Richard G. Jackson

[57] ABSTRACT

The present disclosure is directed to a nickel pillared interlayered clay characterized by a temperature program reductin maxima of less than 500° C., a Type V adsorption/desorption isotherm and a bimodal pore size distribution. This clay has particular application in the catalytic hydrogenation of an unsaturated edible oil wherein an edible oil is contacted with catalytically effective amount of the clay.

15 Claims, 5 Drawing Sheets

NICKEL PILLARED INTERLAYERED CLAY

BACKGROUND OF THE DISCLOSURE

1. Field of the Invention

The present invention is directed to a nickel pillared interlayered clay. More specifically, the present invention is directed to a nickel pillared interlayered clay useful as a catalytic agent in the hydrogenation of unsaturated edible oils.

2. Background of the Prior Art

Pillared interlayered clays are formed from naturally occurring and synthetic layered smectites. Of particular interest are the montmorillonite and laponite types of smectite layered silicates. These silicates may be visualized as "sandwiches" composed of silicate sheets containing four sheets of oxygen atoms. Smectites, especially montmorillonites and laponites, are synthesized into pillared interlayered clays by exchanging the cation in the natural silicate with a desired cationic species. This is accomplished by swelling the natural smectite in a suitable solvent, typically water, and adding the desired replacement cation to the suspension. Although aluminum cations are most commonly employed, the pillared interlayered clay formed by this process may be a nickel pillared interlayered clay, that is, the replacementation may be nickel cations.

This procedure results in the formation of a pillared interlayered clay because the cation introduced between clay platelets is more strongly attracted electrically than the cation naturally present in the smectite. Moreover, if the cation introduced into the smectite to form the pillared interlayered clay is catalytically active the so-formed pillared interlayered clay can be utilized as a catalyst.

The use of Group VIII noble metals and compounds containing Group VIII noble metals as hydrogenation catalysts is well known in the art. For example, the utilization of such Group VIII noble metals as palladium and platinum in this application is well established. It is known that a non-noble Group VIII metal, nickel, can also be used in the catalytic hydrogenation of unsaturated aliphatic compounds. Indeed, Israeli Patent Application 58,565, filed Oct. 25, 1979 and published Nov. 30, 1982, discloses a montmorillonite-based hydrogenation catalyst formed from a nickel pillared interlayered clay. That clay is utilized in the '565 application as a catalyst, in conjunction with a Group VIII noble metal, in the hydrogenation of the cycloalkene, cyclohexene, to form the cycloalkane, cyclohexane.

The catalyst of the '565 patent application is formed by the reaction of sodium hydroxide with nickel chloride in a water solution in which the nickel hydroxide precipitate is collected. The liquid is removed and the precipitate redispersed. This precipitate forms a hydrous sol and is aged for about 3 to 5 days. Thereupon, the sol is reacted with montmorillonite to form a nickel pillared interlayered clay.

Another nickel interlayered clay is disclosed by S. Yamanaka et al., *Clays and Clay Minerals*, 26 (1), 21 (1978). Yamanaka et al. describes several metal pillared interlayered clays of which nickel is an example. The nickel pillared interlayered clay of Yamanaka et al. is produced by mixing sodium hydroxide, nickel chloride and montmorillonite in water and allowing the solution to age at room temperature for 10 days. The filtered product of this reaction is a nickel pillared interlayered clay characterized by a ratio of hydroxyl groups, $OH^-$, to nickel ions, $Ni^{++}$, of between 0 and 2.0 on a molar basis. The nickel pillared interlayered clay of Yamanaka et al. is furthermore characterized by a "Q" value, the molar ratio of nickel, measured as nickel millimoles, to the clay ion exchange capacity, measured in milliequivalents of clay, of between 0 and 16.

Although the above disclosures represent advances in the art, still, the methods utilized in the formation of these nickel pillared interlayered clays cannot easily be commercially exploited due to the complexity of the methods used in their formation. Both methods require aging for several days. This processing step adds unacceptably long processing time. In addition, the clays produced in accordance with these procedures do not include as high a concentration of nickel to insure effective catalytic activity of the thus formed nickel pillared interlayered clay. In general, higher concentration of nickel in the clay, results in increased catalytic effect. Indeed, gas adsorption data establishes that surface area, pore volume and cyclohexane adsorption capacity of the nickel pillared interlayered clays of these teachings are not as high as that required to insure that they can be used in catalytic applications.

One particular hydrogenation reaction of considerable importance is the hydrogenation of unsaturated edible oils. The recent emphasis on reduction of serum cholesterol and the control of hyperlipidemia in general as a means of preventing heart disease has focused on the importance of unsaturated edible oils in a healthy diet. Of course, natural unsaturated oils must be hydrogenated to be ingestible. However, the degree of unsaturation of the hydrogenated oils is important not only in so far as edibility is concerned but, in addition, in order to insure that the oils do not contribute to increased blood vessel blockage. Surprisingly, recent studies have established that certain oils, having narrowly defined degrees of unsaturation, actually reduce blood vessel clogging in humans. Thus, there is a continuing need in the art to develop catalysts that can be used to form edible oils having the exact desired degree of unsaturation best suited to a healthy diet.

The above remarks establish the desirability of developing new and improved pillared interlayered clays which have particular application as catalysts in the hydrogenation of edible oils.

BRIEF SUMMARY OF THE INVENTION

A new class of nickel pillared interlayered clay has now been discovered which can be rapidly produced without long aging delays. This class of nickel pillared interlayered clay is characterized by a nickel content, surface area, pore volume and adsorption capacity in excess of those possessed by the nickel pillared interlayered clays of the prior art. This class of clay finds particular application as a catalytic agent in the hydrogenation of edible oils to produce products whose saturation/unsaturation characteristics are particularly attractive to those concerned with the adverse effects of hyperlipidemia.

In accordance with the present invention, a nickel pillared interlayered clay is provided. This clay is characterized by a temperature program reduction maxima of less than 500° C., a type V adsorption/desorption isotherm and a bimodal pore size distribution.

In further accordance with the invention, a process for making a nickel pillared interlayered clay is described. In this process a nickel salt is reacted with a strong base in water. The nickel-containing precipitate of this reaction is aged for at least about one hour. The aged precipitate is contacted with a smectite suspension in water to produce the nickel pillared interlayered clay product.

In further accordance with the present invention, a process for the hydrogenation of unsaturated edible oils is provided. This process comprises contacting an unsaturated edible oil under suitable hydrogenation conditions with a catalytically effective amount of a nickel pillared interlayered clay.

BRIEF DESCRIPTION OF THE DRAWINGS

The present invention will be better understood with reference to the accompanying drawings of which.

DETAILED DESCRIPTION

Figure 1:
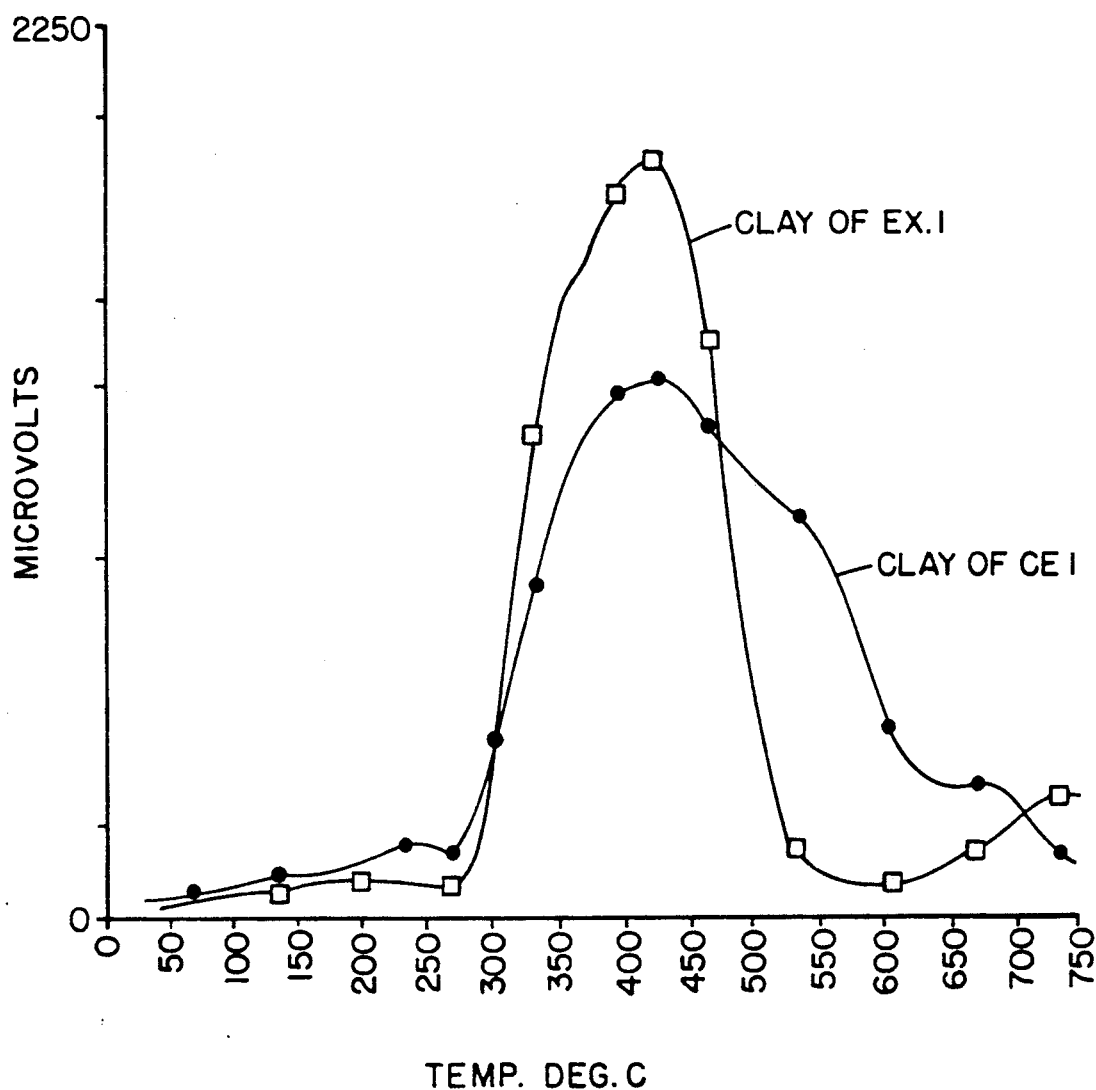
FIG. 1 is a plot of microvolts as a function of temperature for a nickel pillared interlayered clay of the present invention and a nickel pillared interlayered clay of the prior art.

Layered silicates of the smectite class, especially montmorillonite and laponite, are naturally occurring clays utilized in the formation of a class of synthetic clays known as pillared interlayered clays. Smectite layered silicates are characterized by silicate sheets containing four sheets of oxygen atoms. In this structure a center layer of octahedral holes is sandwiched between two layers of tetrahedral holes. The octahedral layer generally contains aluminum ions, $Al^{+++}$, or ferric ions, $Fe^{+++}$. The tetrahedral layer usually contains silicon ions, $Si^{++++}$. The upper layer has its vertices pointing downward, while the lower layer has its vertices pointing upward.

These materials exhibit interesting and useful properties. A net negative charge is developed when substitutions occur within either the octahedral or tetrahedral metal layer. This negative charge is balanced by exchangeable cations that reside within the intralamellar region formed by two clay platelets aggregating around the cations. The location of the charge in the octahedral or tetrahedral layer plays a minor role and can be ignored for the purposes of this discussion.

The exchangeable cations of the smectite, preferably montmorillonite, can be replaced with any other cationic species. Such exchange can be accomplished by swelling the clay in any suitable solvent, usually water, to form a suspension and mixing the desired replacement cation with this suspension. It has been found that if the cationic species itself is catalytically active, the resulting pillared interlayered clay will generally also be catalytically active. The so-called "pillared" effect is the result of separation between the clay platelets effected by the insertion of replacement cations that are larger, on a molecular scale, than are the replaced cations present in the natural smectite.

The insertion of large cationic species into the naturally occurring clay is easily generated by hydrolyzing the desired replacement metal, that is, the replacement cationic species, in a basic or acidic solution. This hydrolysis reaction can be carried out at almost any temperature and pressure. In systems where hydrolysis is slow, the temperature is preferably elevated. Because aluminum is very easily hydrolyzed, attention in the prior art was focused on aluminum pillared interlayered clays. However, other suitable metals, such as chromium, iron, zirconium, molybdenum, niobium and the like have also been utilized to produce pillared interlayered clays. In the present invention, however, nickel is used as the replacement cation to produce a nickel pillared interlayered clay.

A new nickel pillared interlayered clay has now been developed wherein a nickel salt, preferably nickel nitrate or nickel chloride, especially nickel nitrate, is reacted with a strong base, preferably an alkali metal hydroxide or an alkaline earth metal hydroxide. More preferably, an alkali metal hydroxide is utilized. Most preferably, sodium hydroxide is the base employed. It is emphasized that other strong bases, such as alkali metal carbonates and bicarbonates may be substituted for the above recited bases.

This reaction results in the precipitation of a nickel-containing compound. The precipitate is allowed to age for at least approximately one hour. Preferably, the precipitate is aged for about one to about twenty hours. After aging, the precipitate is filtered and contacted with a suspension of a smectite, preferably montmorillonite, in water. The product of this contact is immediately separated from the water, without further aging, to produce the nickel pillared interlayered clay of the present invention.

This simple synthesis route results in a nickel pillared interlayered clay having greater nickel content, surface area, pore volume and cyclohexane adsorption capacity than the nickel pillared interlayered clays of the prior art. These characteristics are manifested by physical properties known in the art.

One such property of a nickel pillared interlayered clay is its temperature program reduction (TPR) profile. This property is defined by a procedure developed by Cvetanovic and Amenomiya. This test is reported in Cvetanovic et al., *Catalyst Rev.*, Vol. 6(1), 21 (1972). This article is incorporated herein by reference.

The Cvetanovic et al. procedure involves the disposition of a 20 mg. sample of the subject clay material in a quartz tube fitted with a thermowell to monitor temperature. The quartz tube is placed in an oven, controllable to within 1° C. A gas composition, comprising 5% by volume hydrogen and 95% by volume nitrogen, is made to contact the clay sample through suitable conduit means. The effluent gas product of this contact, between the sample and the gas stream, flows, by means of suitable conduit means, out of the oven into a thermal conductivity detector of a gas chromatograph. The gas chromatograph interfaces with a computer to receive the output of the thermal conductivity detector. It records changes in gas composition, in terms of microvolts, as a function of temperature. The temperature of the sample is continually increased, by increasing the temperature in the oven, at a rate of 10° C. per minute. The maximum potential difference, in microvolts, defines a peak in the curve of microvolts as a function of temperature. The temperature corresponding to that peak is the maximum temperature program reduction.

Each sample has at least one peak. The actual number of peaks is a function of species present.

The nickel pillared interlayered clay of the present invention has no temperature program reduction (TPR) maxima above about 500° C. Preferably, the TPR maxima of the nickel pillared interlayered clay of the instant invention is less than about 450° C. The maximum number of peaks, that is, the number of TPR maxima of the pillared interlayered clay of this invention, is two. More preferably, the number of TPR maxima is one.

Another characterizing property of pillared interlayered clays is their adsorption/desorption isotherms. This isotherm measures the volume of pores in the clay. Details of this property are included in the paper, Barrett et al., *JACS*, 73, 373 (1951) incorporated herein by reference. Generation of the isotherm follows the procedure of ASTM Standard Test Method D-3663-78, also incorporated herein by reference, which applies to the point where the ratio of partial to total pressure, that is, up to a p/p°, of 0.3. The procedure of ASTM Standard Test Method D-3663-78, is, in this invention, continued up to a p/p° of 1 to generate the complete isotherm. Divergence between adsorption and desorption, manifested by the isotherm, is a function of pore geometry. Thus, the degree of hysteresis or divergence is a manifestation of differences in the uniformity and shape of the pores. This manifestation is defined by categorization into five classes, Type I to Type V isotherms. The nickel pillared interlayered clay of the present invention is characterized as a Type V adsorption/desorption isotherm.

Still another characteristic of a pillared interlayered clay is its pore volume distribution. This characteristic is, like the adsorption/desorption isotherm, a property obtained from a curve defining the plotted relationship of two functions. In this case the curve traces the relationship of pore volume as a function of unit pore radius of the clay. Clays are characterized by the number of peaks obtained over the complete range of pore radius, measured in Angstroms. The nickel pillared interlayered clay of the present invention is characterized by a bimodal pore size distribution. That is, the nickel pillared interlayered clay of this invention is characterized by two peaks over the complete range of pore radius of the clay. A complete discussion of bimodal pore size distribution is provided in the Barrett et al. article. Moreover, the experimental procedure by which the data for this curve is obtained is also provided by ASTM Standard Test Method D-3663-78, except that the maximum p/p° ratio of that test is again extended up to a p/p° ratio of 1.

Yet another characteristic of a pillared interlayered clay is its so-called "Q" ratio. This ratio measures the concentration of the metal in the pillared interlayered clay to its clay concentration. Specifically, it measures the metal, in this case, nickel, in millimolar concentration terms, per milliequivalent of clay. The nickel pillared interlayered clay within the contemplation of the present invention is characterized by a Q value of from about 4 to about 30. Preferably, the Q ratio of the clay of the present invention is in the range of from about 6 to about 20. More preferably, the Q value is in the range of from about 8 to about 15. Still more preferably, the Q value ranges from about 10 to about 14. In a particularly preferred embodiment of the nickel pillared interlayered clay of the present invention, the Q value is about 12.

A particularly important use of nickel pillared interlayered clays is as a catalyst in the hydrogenation of unsaturated edible oils. Edible oils must be substantially saturated for human consumption. However, oils extracted from natural sources, providing useful raw materials for the synthesis of edible oils, are usually long chained fatty acids with multiple unsaturation sites therein.

Many catalytic agents are employed in the hydrogenation of such oils. Usually, a noble metal of Group VIII of the Periodic Table of the Elements is employed to catalyze this reaction. Although noble metal catalysts admirably perform this function, the cost of noble metal catalysts inhibits their use in favor of lower cost metal catalysts. One such metal that is known to be useful in the hydrogenation of unsaturated aliphatic compounds is nickel. However, the performance of nickel hydrogenation catalysts in the past have left much to be desired.

One major problem associated with the use of the nickel hydrogenation catalysts of the prior art was the production of a mixture of hydrogenated oils containing too high a concentration of transisomers. An example of this criticism is the hydrogenation of commercially extracted vegetable oils, such as canola oil, also known as rapeseed oil. Although hydrogenation in commercial practice occurs in one step, the hydrogenation of canola oil actually involves three distinct reactions steps. The base oil, which contains three unsaturation sites, i.e., a triene, is first hydrogenated to produce a product having two unsaturation sites, that is, a diene. The diene, in a second hydrogenation step, is converted into a monoene, a compound having a single unsaturation site. In the last step, the monoene is fully saturated. This sequence can be summarized by the following series of chemical reactions.

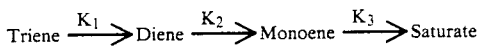

$$\text{Triene} \xrightarrow{K_1} \text{Diene} \xrightarrow{K_2} \text{Monoene} \xrightarrow{K_3} \text{Saturate}$$

A computer program has been generated to define the values of these rate constants, $K_1$, $K_2$ and $K_3$. This program is reported by R.O. Butterfield et al., *The Journal of the American Oil Chemists' Society*, 44, 549 (1967), incorporated herein by reference. The program calculates the rate constant ratios, $K_1/K_2$ and $K_2/K_3$. The Butterfield et al. paper indicates that a high $K_2/K_3$ ratio is desirable since this establishes that hydrogenation of the diene to the monoene occurs more rapidly than the hydrogenation of the monoene to the saturate.

It has been found that the nickel pillared interlayered clay of the present invention serves to provide a hydrogenation catalyst having these desirable properties. That is, the use of the nickel pillared interlayered clay of the instant invention results in a more rapid reaction to form the monoene from the diene than the formation of the saturated oil from the monoene. As a result, commercially important edible oils, such as canola oil, are processed with minimum formation of undesirable transisomers. This result assures the production of edible oils having favorable lipidemic effects when ingested by humans. Indeed, in some instances these oils actually have a blood vessel unclogging effect. Therefore, another aspect of the present invention is directed to a process for hydrogenating an unsaturated edible oil which comprises contacting an unsaturated edible oil with a catalytically effective amount of a nickel pillared interlayered clay having the characteristics of the nickel pillared interlayered clay of the present invention.

In the process of this invention an unsaturated edible oil is contacted with a catalytically effective amount of the nickel pillared interlayered clay of the instant invention. Preferably, this reaction occurs at a temperature in the range of from about 100° C. to about 160° C. and at a hydrogen partial pressure in the range of from about 40 psig to about 100 psig. The time over which this hydrogenation reaction occurs is in the range of from about 60 minutes to about 120 minutes.

Preferably, the hydrogenation reaction of the present invention occurs at a temperature of from about 100° C. to about 140° C. and at a hydrogen partial pressure in the range of from about 45 psig to about 75 psig. The time duration of the reaction is in the range of from about 75 minutes to about 105 minutes.

More preferably, the thermodynamic conditions of the hydrogenation reaction include a temperature in the range of from about 100° C. to about 120° C. and a hydrogen partial pressure of from about 48 psig to about 55 psig. The time period of the reaction ranges from about 85 minutes to about 95 minutes.

The following examples are given to illustrate the present invention. Because these examples are given for illustrative purposes only, it is understood that the invention is not limited thereto.

EXAMPLE 1

Preparation of a Nickel Pillared Interlayered Clay

A solution of nickel nitrate was formed by dissolving nickel nitrate (8.415 g.) in water (145 ml.). An aqueous solution of sodium hydroxide (0.9317 N) was added dropwise to the nickel nitrate solution until 410 ml. was added thereto. The resultant solution was heated at reflux (100° C.) for 20 hours. Thereupon, montmorillonite (2.9 g.) was added thereto. The resultant solution was centrifuged and air dried.

The solid product of this centrifugation, a nickel pillared interlayered clay, was characterized by a Q ratio of 12.5 and a ratio of hydroxyl ions to nickel ions of 1.32. The resultant nickel pillared interlayered clay was also characterized by a specific surface area of 70 sq. meters per gram and comprised 28.3% nickel.

EXAMPLE 2

TPR of the Nickel Pillared Interlavered Clay

The pillared clay, formed in Example 1, was tested to determine its physical properties. The first such test was a determination of its TPR, that is, its temperature program reduction, profile. To this end a sample of the clay was tested in accordance with the procedure of Cvetanovic and Amenomeya, supra. The result of this test is presented in FIG. 1 in the curve designated "Clay of Ex. 1."

This curve establishes that this pillared clay is characterized by two TPR maxima, at about 360° C. and at about 440° C.

EXAMPLE 3

Adsorption/Desorption Isotherm of the Nickel Pillared Interlayered Clay

A nickel interlayered clay, generated in accordance with the procedure of Example 1, was subjected to the procedure of the aforementioned Barrett et al. article and ASTM Standard Test Method D 3663-78 with p/p° measurements extended to 1.

Figure 2:
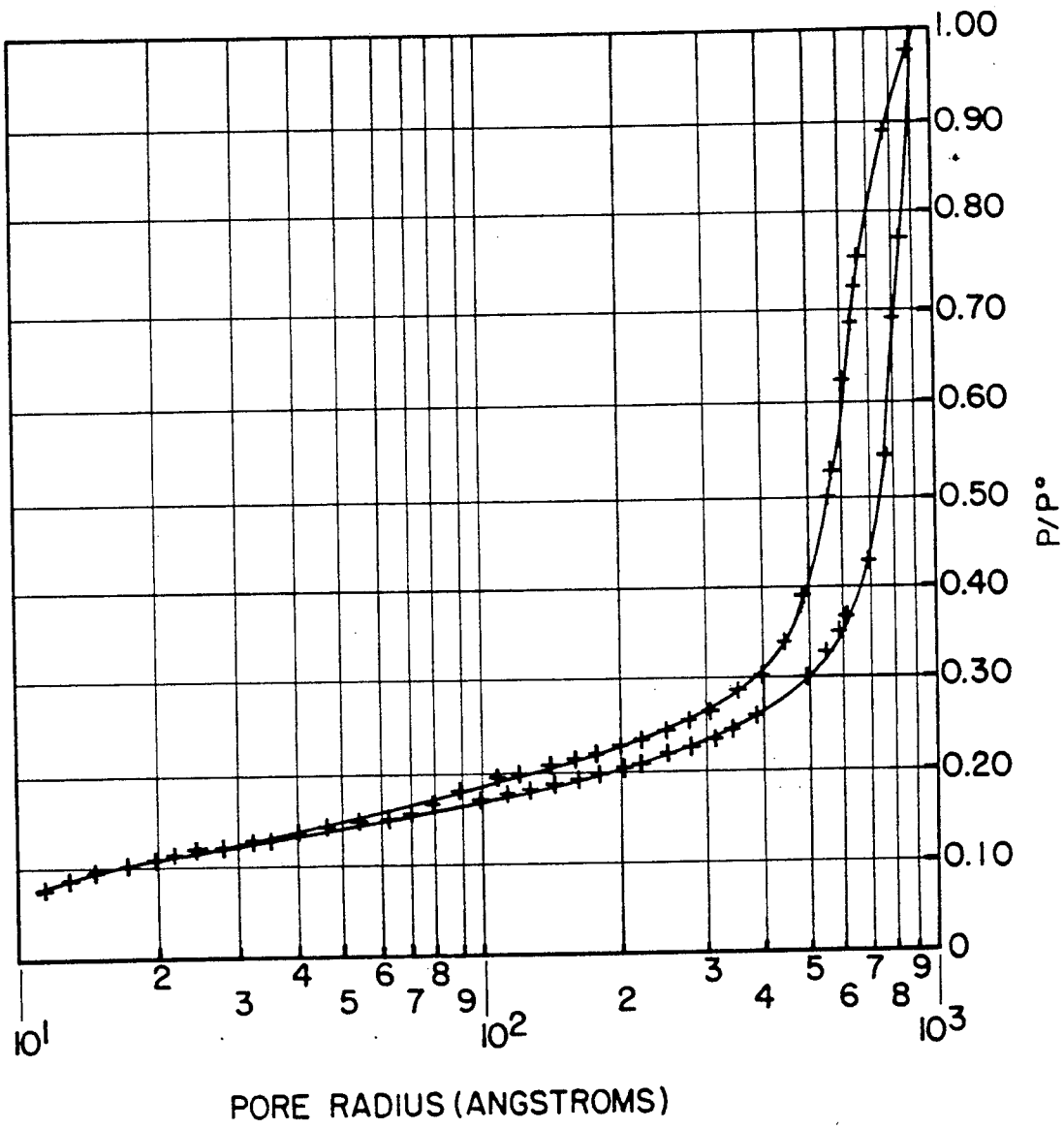
FIG. 2 is a plot of the ratio of partial pressure to total pressure as a function of pore radius for a nickel pillared interlayered clay of the present invention.

The results of this test are depicted in FIG. 2.

EXAMPLE 4

Pore Volume of the Nickel Pillared Interlayered Clay

A nickel pillared interlayered clay formed in accordance with Example 1 was subjected to the procedures of the Barrett et al article and modified ASTM Standard Test Method D 3663-78 to determine its pore volume characteristic.

Figure 3:
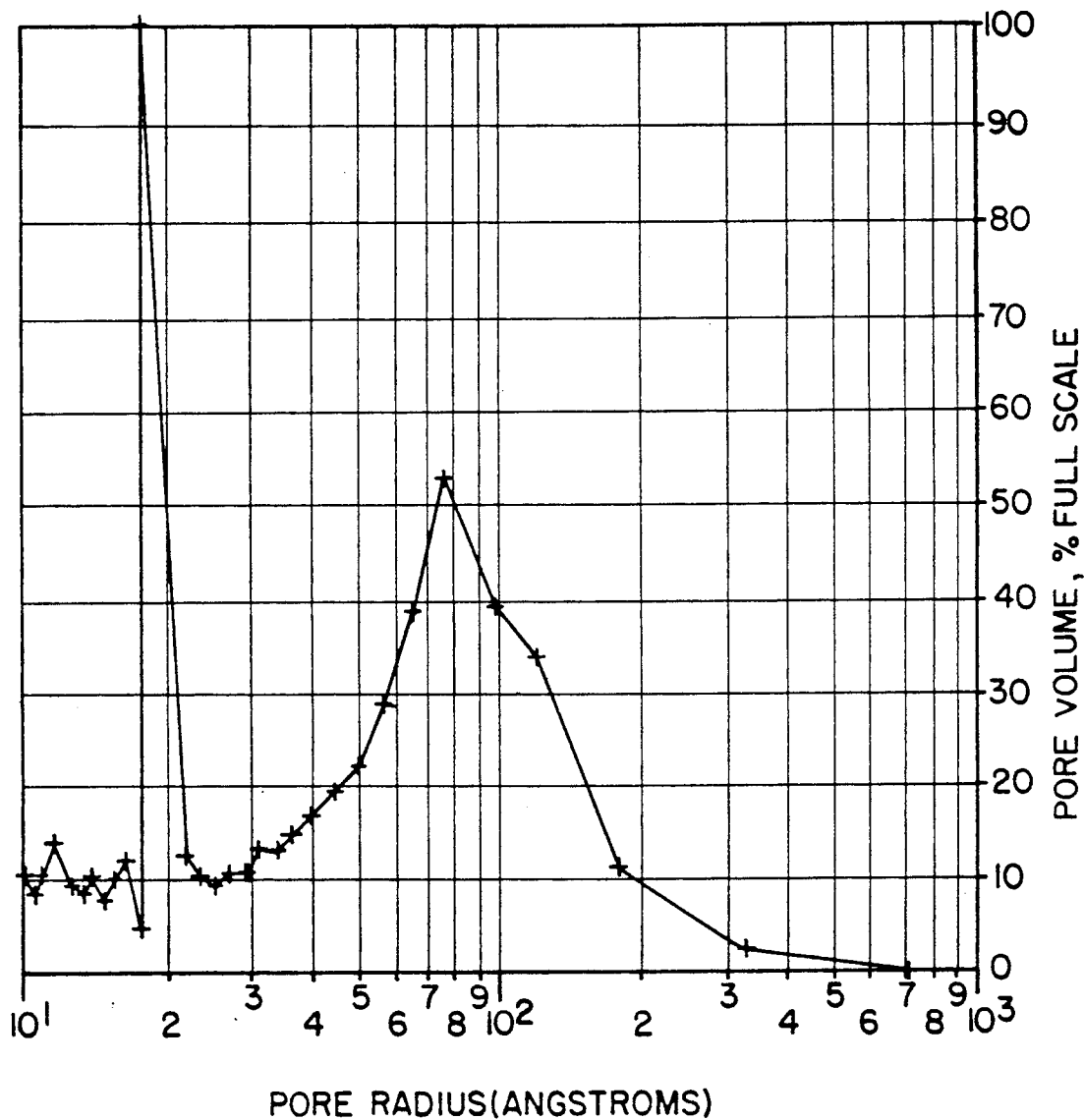
FIG. 3 is a plot of incremental pore volume as a function of pore radius for a nickel pillared interlayered clay of the present invention.

In accordance with this procedure a curve of incremental pore volume as a function of pore radius was generated. This curve is depicted in FIG. 3. FIG. 3 demonstrates two peaks which establish that the nickel interlayered clays of the present invention are characterized by a bimodal pore size distribution.

COMPARATIVE EXAMPLE 1 (CE1)

Formation and Characterization of a Nickel Pillared

Interlayered Clay of the Prior Art

A nickel pillared interlayered clay was formed in accordance with Example 1 of Israeli Patent Application 58,565, which disclosure is incorporated herein by reference.

The clay formed in accordance with the procedure of this prior art reference was subjected to the tests of Examples 2, 3 and 4 wherein its TPR profile, its adsorption/desorption isotherm and its pore volume characteristics were established.

The TPR profile generated for the clay made in accordance with Example 1 of Israeli Patent Application 58,565 is depicted in FIG. 1. Specifically, the curve designated "Clay of CE 1" characterizes the clay of that prior art process. Analysis of that curve shows that there are three TPR maxima, at about 440° C., at about 535° C. and at about 665° C.

Figure 4:
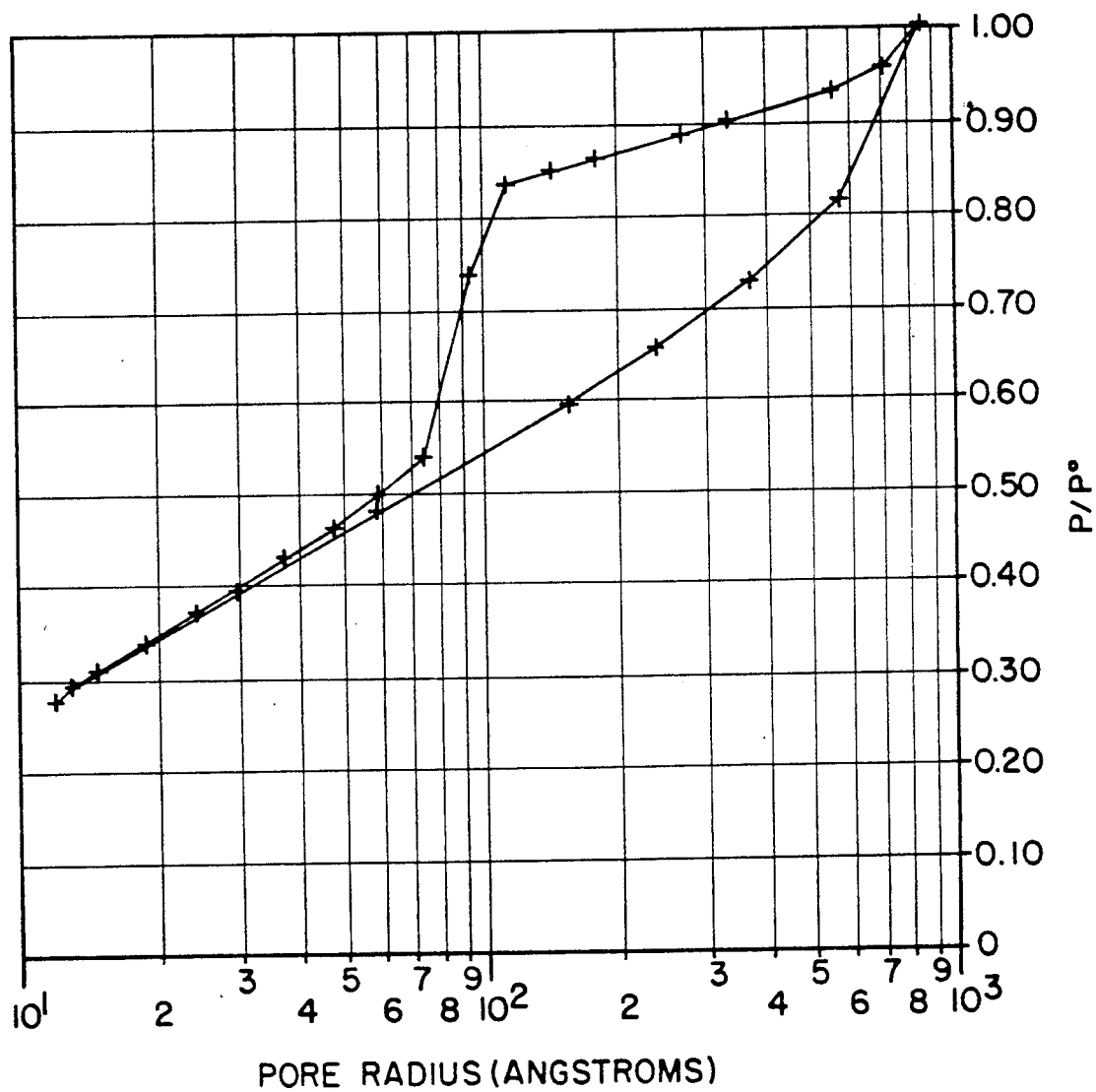
FIG. 4 is a plot of incremental pore volume as a function of pore radius for a nickel pillared interlayered clay of the prior art.

The adsorption/desorption isotherm of the clay of Example 1 of Israeli Patent Application 58,565, generated in accordance with Barrett et al article and ASTM Standard Test Method D 3663-78 with p/p° measurements extended to 1, appears in FIG. 4. In accordance with the Barrett et al. article, the curve is a classical Type IV isotherm.

Figure 5:
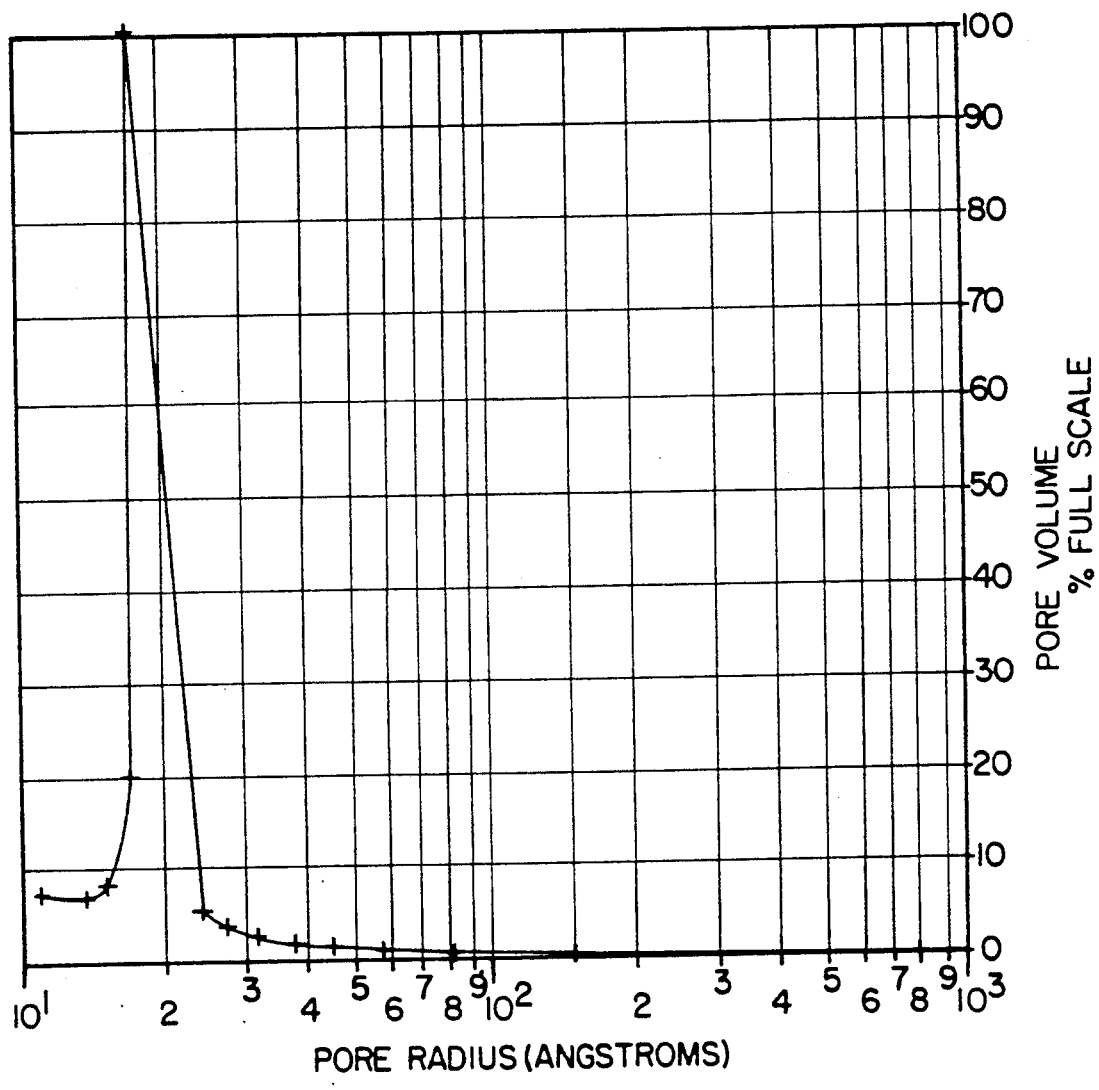
FIG. 5 is a plot of the ratio of partial pressure to total pressure as a function of pore radius for a nickel pillared interlayered clay of the prior art.

The pore volume of the nickel pillared clay, made in accordance with Example 1 of Israeli Patent Application 58,565, is depicted in FIG. 5. FIG. 5 is a curve of incremental pore volume as a function of pore radius. The curve establishes that the clay of the Israeli patent application possesses a monomodal pore size distribution.

EXAMPLE 5

Hydrogenation of Canola Oil

A nickel pillared interlayered clay formed in accordance with Example 1 was utilized as a catalyst in the hydrogenation of canola oil. A "salad grade" canola oil, characterized by its yellow color, was hydrogenated in this test.

The canola oil was diluted in heptane, in which it is soluble, to form a 20% heptane solution. Fifty ml. of the 20% solution of the salad grade canola oil was placed in a 300 ml. stirred reactor having a glass liner and a cooling coil. To the stirred reactor was additionally added 0.18 g. of a nickel pillared interlayered clay formed in accordance with the procedure of Example 1. The reactor was sealed and the stirrer was rotated at 800 rpm. The reactor was purged twice with nitrogen by pressurizing the reactor to 300 psig followed by venting.

Thereupon, the reactor was heated to a temperature of 120° C. and pressurized with nitrogen to 50 psig. At this point hydrogen gas was added to the reactor to increase the pressure therein to 100 psig. Upon reaching these thermodynamic conditions, the reaction commenced. The reaction continued for 90 minutes. That is, the reactor containing the clay catalyst and the canola oil solution was maintained at a hydrogen partial pressure of 50 psig, a total pressure of 100 psig and a temperature of 120° C. for 90 minutes.

Upon the completion of the 90 minute reaction, the hydrogen gas inlet was closed, heating was discontinued and cooling initiated by passing cold water through the cooling coil for 1 hour to reduce the temperature to ambient. At this time the reactor pressure was reduced to ambient and the reactor opened.

The contents of the reactor were filtered and analyzed by gas-liquid chromatography of methyl esters in accordance with ASTM D 1983-64T. The conversion rate of the $C_{18}$ triene hydrocarbon stream, the concentration of trans isomer and the rate constant ratios were determined either directly or through the methods provided by the Butterfield et al. article.

Based on this analysis the conversion rate of the $C_{18}$ trienes, the concentration of the trans isomer and the relative reaction rates, that is, the ratio of the rate constants $K_1/K_2$ and $K_2/K_3$, for the canola oil were calculated. These results appear in Table I as Example 5, Experiment A.

EXAMPLE 6

Additional Hydrogenation Runs Utilizing a Nickel Pillared Interlayered Clay Catalyst Three additional experiments were conducted utilizing the same catalyst used in Example 5. As stated in Example 5, the hydrogenation of the canola oil of that example is included in Table I as Ex. 5, Experiment A.

The first additional experiment, Experiment B, differed from the procedure of Example 5, Experiment A, only insofar as the reaction temperature was reduced to 100° C. That is, the reactor conditions of Example 5 were reproduced in this experiment, Experiment B, but reduction of the reaction temperature to 100° C., rather the 120° C. reaction temperature of Example 5.

In the second hydrogenation run, Experiment C, the reaction temperature was again 100° C., as in Experiment B, but the hydrogen partial pressure, 50 psig, of Experiments A and B was increased to 800 psig. Thus, the total pressure in the reactor during the reaction was 850 psig, the hydrogen partial pressure being the difference between the pressure before hydrogen addition and the final pressure.

In the last experiment, Experiment D, the procedure of Example A was repeated but for increasing the temperature of the reaction to 160° C. from the 120° C. temperature of Example 5.

It is emphasized that, as in Example 5, all hydrogenation reactions were conducted utilizing 50 ml. of a 20% solution of canola oil in heptane.

The results of these additional runs are reported in Table I.

COMPARATIVE EXAMPLE 2 (CE 2)

Hydrogenation of Canola Oil by a Commercial Nickel Catalyst

A series of canola oil hydrogenation reactions were conducted utilizing a nickel kieselguhr catalyst. Nickel kieselguhr is a commercially available catalyst employed in applications wherein a nickel catalyst is desired. This type of catalyst is oftentimes utilized in the hydrogenation of edible unsaturated oils.

To test the effectiveness of this known commercial nickel catalyst, the nickel kieselguhr catalyst was utilized under the same hydrogenation conditions as was employed in Example 5. That is, the example denoted as Example 5, Experiment A, was repeated but for the replacement of the nickel pillared interlayered clay of the present invention with the nickel kieselguhr catalyst of the prior art. The results of this experiment are summarized, also in Table I, as Comparative Example 2, Experiment A.

An additional series of four hydrogenation reactions, utilizing the same nickel kieselguhr catalyst, were run under identical conditions, but for the duration of the run and the identity of the catalyst, with the runs conducted in Example 6. For ease in comparing these runs, the hydrogenation reactions of the present example are denoted by experimental letters corresponding to the conditions used in Example 6 wherein the catalyst utilized was the nickel pillared interlayered clay of the present invention. Thus, in addition to Comparative Example 2, Experiment A, discussed above, Comparative Example 2, Experiments B to D, whose experimental conditions correspond to Example 6, Experiments B to D, respectively, were run. An additional run, denoted as Comparative Example 2, Experiment E, representing the case where a hydrogenation reaction temperature of 140° C. was employed, was also conducted. This run was not identical with any of the runs of Examples 5 or 6.

All of these runs are summarized in Table I.

TABLE I

| | | Canola Oil Hydrogenation | | | | Rel. Reduction Rate | | |
|---|---|---|---|---|---|---|---|---|
| Catalyst | Example No. | Temp, °C. | $H_2$ Press, psig | Time, min | % Conv $C_{18}$ Triene | $K_1/K_2$ | $K_2/K_3$ | % Trans isomer |
| Ni-PILC | 5, Exp. A | 120 | 50 | 90 | 39 | 1.4 | 17.0 | 3.7 |
| Ni/Kies. | CE2, Exp. A | 120 | 50 | 90 | 100 | NC | 7.6 | 19.5 |
| Ni-PILC | 6, Exp. B | 100 | 50 | 90 | 23 | 1.6 | 5.0 | 1.6 |
| Ni/Kies. | CE2, Exp. B | 100 | 50 | 60 | 53 | 1.8 | 9.0 | 5.2 |
| Ni-PILC | 6, Exp. C | 100 | 800 | 90 | 57 | 2.2 | 6.9 | 2.3 |
| Ni/Kies. | CE2, Exp. C | 100 | 800 | 60 | 100 | NC | NC | 0 |
| Ni-PILC | 6, Exp. D | 160 | 50 | 90 | 100 | NC | NC | 39.3 |
| Ni/Kies. | CE2, Exp. D | 160 | 50 | 90 | 100 | NC | NC | 0 |
| Ni/Kies. | CE2, Exp. E | 140 | 50 | 90 | 100 | NC | 1.2 | 0 |

Note:
NC indicates triene and/or diene was completely hydrogenated so that no rate constant could be calculated.
Ni-PILC is the nickel pillared interlayered clay catalyst
Ni/Kies is the nickel kieselguhr catalyst.

COMPARATIVE EXAMPLE 3

Hydrogenation of Canola Oil With a Ni-Pillared Interlayered Clay of the Prior Art Two nickel pillared interlayered clays were prepared in accordance with the procedure of Israeli Patent Application 58,565. These products were tested as hydrogenation catalysts in a procedure similar to that utilized in Example 5. That is, each of the catalysts were used to hydrogenate salad grade canola oil. The only difference between the procedure of Example 5 and the testing of the catalyst of the '565 application was the decrease in temperature of the hydrogenation reaction from 120° C. to 110° C. Otherwise, the procedures and conditions of the reactions were identical.

An analysis identical to that performed in the canola oil products of Example 5 was conducted on the canola oil products of the '565 application. The results of this analysis appear in Table II, which reports percent conversion of the $C_{18}$ triene fraction, the rate constant ratios, $K_1/K_2$ and $K_2/K_3$, and the concentration of the undesirable trans isomer in the final product. For comparison purposes the same results obtained in the hydrogenation of canola oil by the catalyst of the present invention, as exemplified by Example 5, Experiment A, is included in Table II.

TABLE II

Comparison of Ni-PILC's

| Catalyst of | $C_{18}$ Triene Conversion, % by Wt. | Relative Reduction Rates | | Trans Isomer, Wt. % |
|---|---|---|---|---|
| | | $K_1/K_2$ | $K_2/K_3$ | |
| Ex. 5, Exp. A[1] | 39 | 1.4 | 17.0 | 3.7 |
| Comp. Ex. 3, Exp A[2] | 70 | 2.2 | 12.6 | 6.8 |
| Comp. Ex. 3, Exp B[2] | 55 | 1.9 | 12.2 | 3.9 |

Notes
[1] Hydrogenation of 50 ml. of 20% canola oil solution at 120° C. and 50 psig $H_2$ for 90 min.
[2] Hydrogenation of 50 ml. of 20% canola oil solution at 110° C. and 50 psig $H_2$ for 90 min.

EXAMPLE 7

Hydrogenation of a Neat Canola Oil

In order to establish that the hydrogenation reaction of the present invention applies to not only edible oil solutions but also to the hydrogenation of neat edible oils, a pair of hydrogenation reactions were conducted. These runs, conducted in accordance with the procedure of Example 5, involved the hydrogenation of 50 ml. of salad grade canola oil employing the same nickel pillared interlayered clay catalyst. The thermodynamic conditions of these runs included a reaction temperature of 120° C., a hydrogen partial pressure of 50 psig, a total pressure of 100 psig and a reaction time of 90 minutes.

The results of these two runs are summarized in Table III. An evaluation of Table III establishes that the process of the present invention applies to the hydrogenation of edible oils whether neat or in solution.

TABLE III

Comparison of Neat and 20% Canola Oil Solution Hydrogenation*

| Canola Oil | Triene Conv., % | Relative Reduction Rate | | Trans Isomer, % by Wt. |
|---|---|---|---|---|
| | | $K_1/K_2$ | $K_2/K_3$ | |
| Neat | 27 | 1.1 | 12.4 | 2.1 |
| 20% Solution | 39 | 1.4 | 17.0 | 3.7 |

*Hydrogenation of 50 ml at 120° C. and 50 psig $H_2$ for 90 min.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A nickel pillared interlayered clay characterized by a temperature program reduction maxima of less than 500° C., a type V adsorption/desorption isotherm, a bimodal pore size distribution and a Q ratio, the ratio of the nickel in said pillared clay to the clay concentration of said pillared clay, of from about 4 to about 30.

2. A clay in accordance with claim 1 wherein said temperature program reduction maxima is less than 450° C.

3. A clay in accordance with claim 1 wherein said value of Q is in the range of from about 6 to about 26.

4. A clay in accordance with claim 3 further characterized by a value of Q in the range of from about 8 to about 15.

5. A clay in accordance with claim 4 wherein said value of Q is in the range of from about 10 to about 14.

6. A clay in accordance with claim 5 further characterized by a value of Q of approximately 12.

7. A process for making a nickel pillared interlayered clay comprising:
reacting a nickel salt with a strong base in water whereby a nickel-containing precipatate is formed;
aging said precipitate for at least about one hour whereby an aged precipitate is formed; and
contacting said aged precipitate with a suspension of a clay in water whereby a nickel pillared interlayered clay is forced.

8. A process in accordance with claim 7 wherein said nickel salt is selected from the group consisting of nickel nitrate and nickel chloride.

9. A process in accordance with claim 8 wherein said nickel salt is nickel nitrate.

10. A process in accordance with claim 9 where said strong base is selected from the group consisting of an alkali metal hydroxide and an alkaline earth metal hydroxide.

11. A process in accordance with claim 10 wherein said strong base is an alkali metal hydroxide selected from the group consisting of sodium hydroxide and potassium hydroxide.

12. Process in accordance with claim 11 wherein said alkali metal hydroxide is sodium hydroxide.

13. A process in accordance with claim 7 wherein said clay is smectite.

14. A process in accordance with claim 13 wherein said smectite is montmorillonite.

15. A process for making a nickel pillared interlayered montmorillonite comprising:
reacting nickel nitrate with sodium hydroxide whereby a precipitate of nickel hydroxide is formed;
aging said nickel hydroxide for a period in the range of from about 1 hour or about 20 hours whereby an aged nickel hydroxide is formed; and
contacting said aged nickel hydroxide with a suspension of montmorillonite in water whereby a nickel pillared interlayered montmorillonite is formed.

* * * * *

UNITED STATES PATENT AND TRADEMARK OFFICE
CERTIFICATE OF CORRECTION

PATENT NO.  : 5,037,787
DATED       : August 6, 1981
INVENTOR(S) : S.D. Landau and J.A. Hinnenkamp It is certified that error appears in the above-identified patent and that said Letters Patent is hereby corrected as shown below:

Column 12, line 40, "forced" should read -- formed --;

Column 12, line 63, "or" should read --to--.

Signed and Sealed this

Eighteenth Day of May, 1993

Attest:

MICHAEL K. KIRK

*Attesting Officer*    Acting Commissioner of Patents and Trademarks